(12) United States Patent
Kuemmel et al.

(10) Patent No.: US 12,392,369 B2
(45) Date of Patent: Aug. 19, 2025

(54) PUSH-ON FASTENER, ASSEMBLY, AND METHOD OF MAKING AND USING THE SAME

(71) Applicant: SAINT-GOBAIN PERFORMANCE PLASTICS PAMPUS GMBH, Willich (DE)

(72) Inventors: Benjamin Kuemmel, Kerkrade (NL); Thiemo Kuesters, Viersen (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 257 days.

(21) Appl. No.: 16/701,619

(22) Filed: Dec. 3, 2019

(65) Prior Publication Data

US 2020/0173485 A1   Jun. 4, 2020

Related U.S. Application Data

(60) Provisional application No. 62/774,565, filed on Dec. 3, 2018.

(51) Int. Cl.
*F16B 37/08* (2006.01)
*F16B 33/00* (2006.01)

(52) U.S. Cl.
CPC ........ *F16B 37/0842* (2013.01); *F16B 33/008* (2013.01)

(58) Field of Classification Search
CPC ........ F16B 21/20; F16B 21/18; F16B 21/186; F16B 43/002; F16B 33/06; F16B 2200/79

USPC ................. 411/520, 521, 525, 526, 528, 534
See application file for complete search history.

(56) References Cited

U.S. PATENT DOCUMENTS

| | | | | |
|---|---|---|---|---|
| 2,309,613 | A | * | 1/1943 | Horton .................. B21D 53/20 411/521 |
| 2,913,950 | A | * | 11/1959 | Tinnerman .............. F16B 21/20 411/436 |
| 2,990,866 | A | | 7/1961 | Macy et al. |
| 2,995,969 | A | | 8/1961 | Kraus et al. |
| 3,304,221 | A | | 2/1967 | Eggleton |

(Continued)

FOREIGN PATENT DOCUMENTS

| | | |
|---|---|---|
| CN | 101737392 A | 6/2010 |
| CN | 102712276 A | 10/2012 |

(Continued)

OTHER PUBLICATIONS

International Search Report and Written Opinion for PCT/EP2019/083435, mailed Mar. 18, 2020, 15 pages.

(Continued)

*Primary Examiner* — Flemming Saether
(74) *Attorney, Agent, or Firm* — Abel Schillinger, LLP; Ann Palma

(57) ABSTRACT

A push-on fastener including a push-on fastener body including an annular base defining an aperture, first and second opposing major surfaces, and a plurality of radial tabs extending from the annular base, the radial tabs terminating radially inwardly or radially outwardly and providing a peripheral surface; and a low friction layer overlying the first major surface of the push-on fastener body, wherein the peripheral surface is free of low friction layer.

16 Claims, 7 Drawing Sheets

(56) References Cited

U.S. PATENT DOCUMENTS

| | | | | |
|---|---|---|---|---|
| 4,001,124 A * | 1/1977 | Hussey | F16C 33/201 | 508/106 |
| 4,746,248 A * | 5/1988 | Lillis | E21D 20/025 | 411/534 |
| 4,834,603 A * | 5/1989 | Holton | B21D 22/04 | 411/521 |
| 4,850,778 A | 7/1989 | Clough et al. | | |
| 4,984,938 A * | 1/1991 | Scott, Jr. | F16B 43/002 | 411/428 |
| 5,244,406 A | 9/1993 | Vranish | | |
| 5,320,303 A * | 6/1994 | Puryear | A01K 89/0102 | 242/234 |
| 5,444,603 A * | 8/1995 | Otsuka | B60Q 1/0683 | 362/273 |
| 5,449,258 A * | 9/1995 | Moote | F16D 1/0858 | 411/521 |
| 5,646,076 A * | 7/1997 | Bortz | F16D 69/026 | 442/164 |
| 5,735,171 A * | 4/1998 | Moote | B60S 1/34 | 15/250.31 |
| 5,803,692 A * | 9/1998 | Postadan | F16B 21/20 | 411/526 |
| 5,860,780 A * | 1/1999 | Lenac | B21J 15/046 | 411/501 |
| 6,435,791 B1 * | 8/2002 | Bydalek | B60B 3/145 | 411/371.2 |
| 6,729,819 B2 * | 5/2004 | Wallace | F16B 31/028 | 411/11 |
| 6,979,129 B2 * | 12/2005 | Farbaniec | F16C 33/206 | 384/907.1 |
| 7,021,875 B2 * | 4/2006 | Yake | F16B 33/06 | 411/111 |
| 7,942,581 B2 * | 5/2011 | Leonardelli | F16C 33/201 | 384/129 |
| 8,408,800 B2 * | 4/2013 | Hagan | F16C 27/02 | 384/296 |
| 8,784,030 B2 * | 7/2014 | Grobecker | F16B 35/06 | 411/534 |
| 8,979,456 B2 | 3/2015 | Soriano et al. | | |
| 9,032,833 B2 * | 5/2015 | Erhardt | B62D 1/16 | 74/492 |
| 9,068,585 B2 * | 6/2015 | Kuehn | F16B 21/20 | |
| 9,227,542 B2 | 1/2016 | Mayer | | |
| 2003/0042804 A1 * | 3/2003 | Cook | H02K 5/1672 | 310/91 |
| 2009/0230752 A1 | 9/2009 | Adragna et al. | | |
| 2011/0049834 A1 | 3/2011 | Natu | | |
| 2016/0069112 A1 | 3/2016 | Neumark et al. | | |
| 2016/0114739 A1 | 4/2016 | Korber | | |
| 2017/0146167 A1 | 5/2017 | Otto | | |
| 2020/0063846 A1 * | 2/2020 | Gall | F16B 43/00 | |

FOREIGN PATENT DOCUMENTS

| | | |
|---|---|---|
| CN | 102785597 A | 11/2012 |
| CN | 104006046 A | 8/2014 |
| JP | S54147350 U | 10/1979 |
| JP | H07229514 A | 8/1995 |
| JP | 2007211852 A | 8/2007 |
| JP | 2009299824 A | 12/2009 |
| JP | 2012251616 A | 12/2012 |
| JP | 2018044574 A | 3/2018 |
| KR | 20150093624 A | 8/2015 |
| KR | 20150094404 A | 8/2015 |
| WO | 9511822 A1 | 5/1995 |
| WO | 9520108 A1 | 7/1995 |
| WO | 2020115020 A1 | 6/2020 |

OTHER PUBLICATIONS

Action Industrial Group, "Bolts, Nuts & Gasket Components", www.actionindgroup.com/washers.html, Aug. 2, 2016, 3 pages.

Fluoro Precision Coatings, "PTFE Coated Fasteners", www.flouroprecision.co.uk/materials-coated/ptfe-coated-fasteners.html, Aug. 2, 2016, 1 page.

Sun Coating Company, "Washers", www.suncoating.com/print.php?washers.html, Aug. 2, 2016, 1 page.

New Process Fibre Co., "Teflon Washers & PTFE Washer & Spacers Manufacturer", www.newprocess.com/ptfe-washers.html, Aug. 2, 2016, 4 pages.

TorqBolt Inc., "Tooth lock Washers, Internal tooth Lock Washer & External tooth lock washers from TorqBolt", www.alloy-fasteners.com/tooth-lock-washers.html, Aug. 2, 2016, 3 pages.

RC Superstore, "Traxxas PTFE-coated washers (5x11x.5mm) (use with self-lubricating bushings)", www.rcsuperstore.com/Traxxas-PTFE-coated-washers-5x11x5mm-use-with-self-lubricating-bushings.html, Aug. 2, 2016, 2 pages.

"Plastic material," Kong Ping, Jul. 31, 2017, pp. 141-146.

* cited by examiner

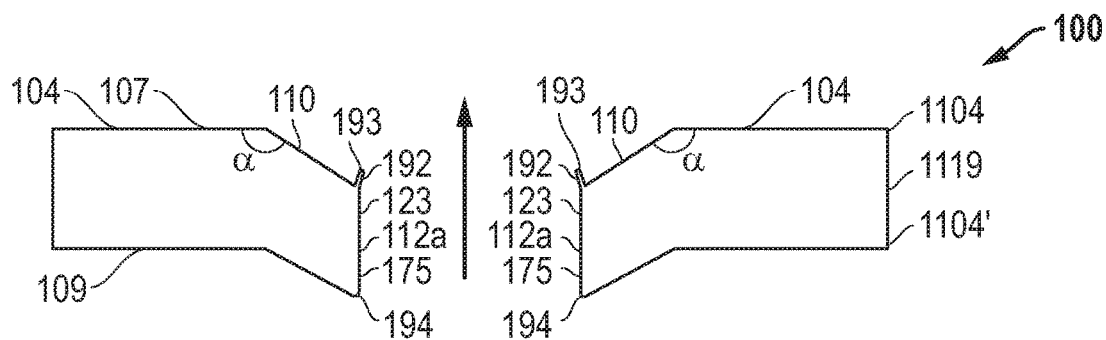
FIG. 3A
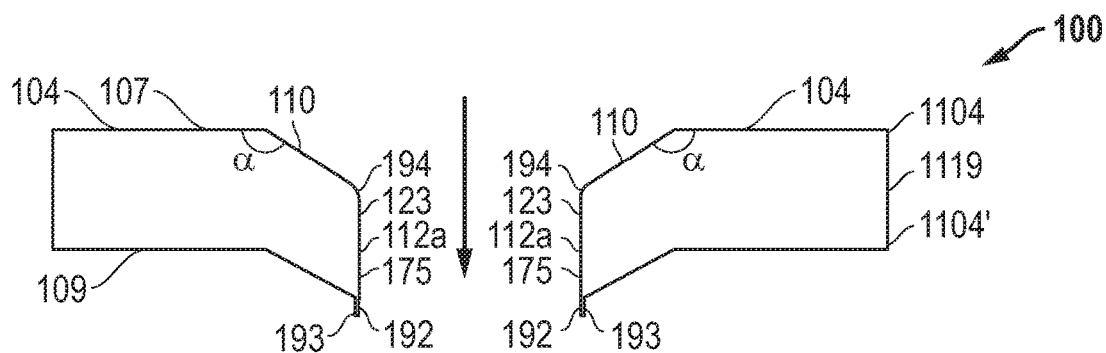
FIG. 3B
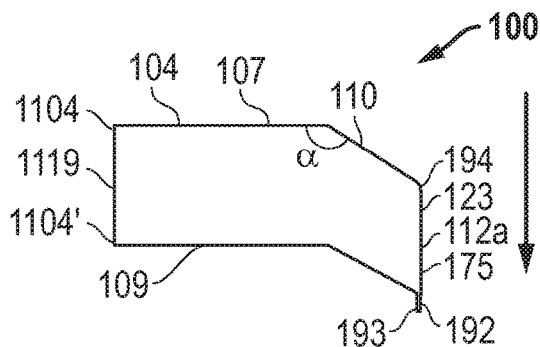 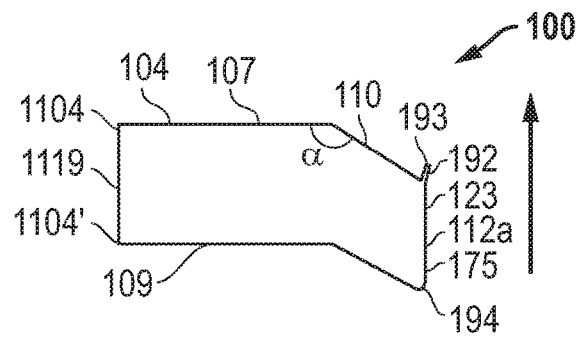
FIG. 3C          FIG. 3D

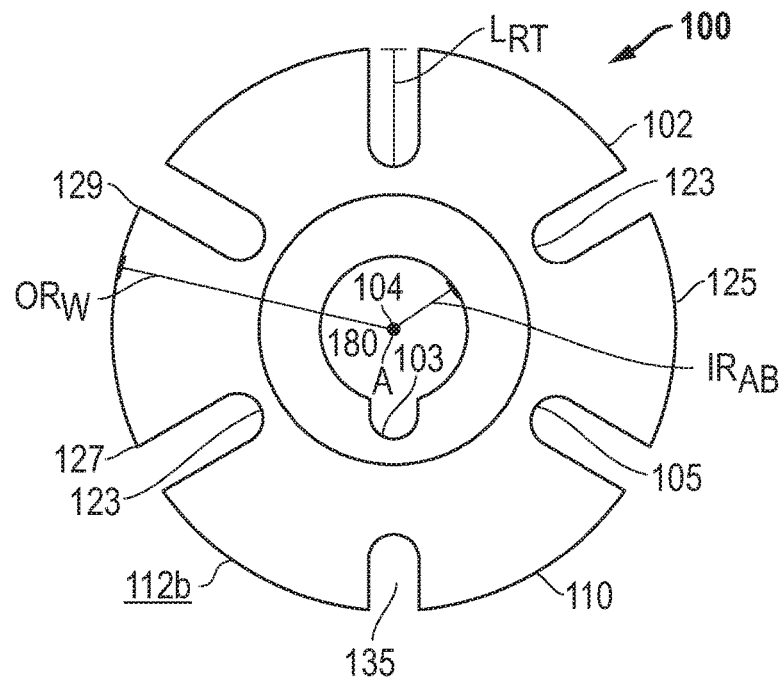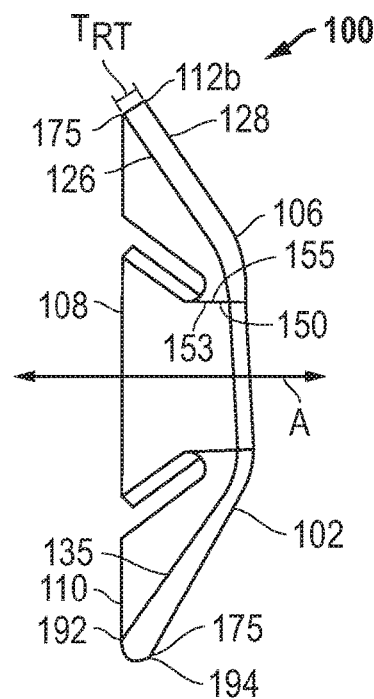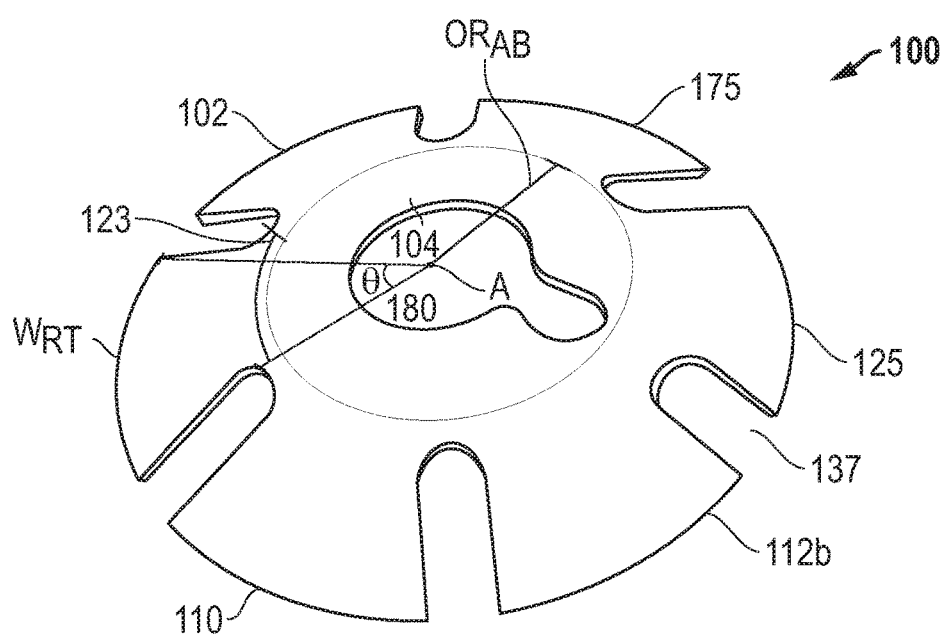
FIG. 7A
FIG. 7B
FIG. 7C

PUSH-ON FASTENER, ASSEMBLY, AND METHOD OF MAKING AND USING THE SAME

CROSS-REFERENCE TO RELATED APPLICATION(S)

This application claims priority under 35 U.S.C. § 119(e) to U.S. Patent Application No. 62/774,565 entitled "PUSH-ON FASTENER, ASSEMBLY, AND METHOD OF MAKING AND USING THE SAME," by Benjamin KUEMMEL et al., filed Dec. 3, 2018, which is assigned to the current assignee hereof and incorporated herein by reference in its entirety.

FIELD OF THE DISCLOSURE

The present disclosure relates to push-on fasteners, and more particularly to push-on fasteners installed on shafts or similar components.

RELATED ART

A push-on fastener may be disposed to distribute load of an inner member, e.g., a shaft in an assembly or mechanism. Specific types of push-on fasteners may be used to axially fix itself to an inner member and interact with another component of the assembly.

In a number of assemblies, the inner member may be rotating during usage where the push-on fastener may move against the side of other components of the assembly, such as an outer member, which may cause friction, vibration, and noise. There continues to be a need for push-on fasteners for use in applications to fix to inner members and provide decreased friction, vibration, and noise while simplifying assemblies, increasing assembly lifetimes.

BRIEF DESCRIPTION OF THE DRAWINGS

Embodiments are illustrated by way of example and are not limited in the accompanying figures.

FIG. 3A includes a side view of a push-on fastener in accordance with an embodiment;

FIG. 3B includes a side view of a push-on fastener in accordance with an embodiment;

FIG. 3C includes a side view of a push-on fastener in accordance with an embodiment;

FIG. 3D includes a side view of a push-on fastener in accordance with an embodiment;

FIG. 7A includes a top view of a push-on fastener in accordance with an embodiment;

FIG. 7B includes a cross-sectional view of a push-on fastener in accordance with the first embodiment;

FIG. 7C includes a perspective view of a push-on fastener in accordance with an embodiment;

Figure 1:
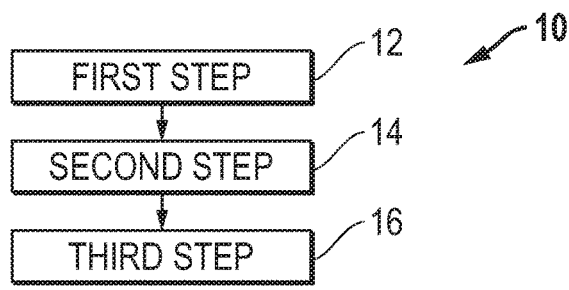
FIG. 1 includes a method of producing a push-on fastener in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the push-on fastener and push-on fastener assembly arts.

Embodiments described herein are generally directed to a push-on fastener and methods of creating and using a push-on fastener within an assembly. In particular embodiments, the push-on fastener may have an annular base and a plurality of radial tabs extending from the annular base. The radial tabs may provide at least one peripheral surface that is free of low friction layer.

For purposes of illustration, FIG. 1 includes a diagram showing a forming process 10 for forming a push-on fastener. The forming process 10 may include a first step 12 of providing a base material, a second step 14 of coating the base material with a low friction coating to form a composite material and a third step 16 of forming the composite material into a push-on fastener.

Referring to the first step 12, the base material may be a substrate. In an embodiment, the substrate can at least partially include a metal. According to certain embodiments, the metal may include iron, copper, titanium, tin, aluminum, alloys thereof, or may be another type of material. More particularly, the substrate can at least partially include a steel, such as, a stainless steel, carbon steel, or spring steel. For example, the substrate can at least partially include a 301 stainless steel. The 301 stainless steel may be annealed, ¼ hard, ½ hard, ¾ hard, or full hard. The substrate may include a woven mesh or an expanded metal grid. Alternatively, the woven mesh can be a woven polymer mesh. In an alternate embodiment, the substrate may not include a mesh or grid.

Figure 2A:
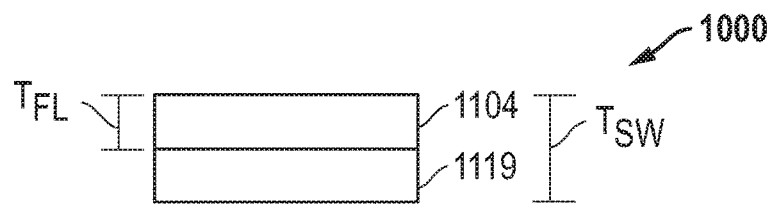
FIG. 2A includes a cross-sectional view of a push-on fastener in accordance with an embodiment.

FIG. 2A includes an illustration of the composite material 1000 that may be formed according to first step 12 and second step 14 of the forming process 10. For purposes of illustration, FIG. 2A shows the layer by layer configuration of a composite material 1000 after second step 14. In a number of embodiments, the composite material 1000 may include a substrate 1119 (i.e., the base material provided in the first step 12) and a low friction layer 1104 (i.e., the low friction coating applied in second step 14). As shown in FIG. 2A, the low friction layer 1104 can be coupled to at least a portion of the substrate 1119. In a particular embodiment, the low friction layer 1104 can be coupled to a surface of the substrate 1119 so as to form a low friction interface with another surface of another component. The low friction layer 1104 can be coupled to the radially inner surface of the substrate 1119 so as to form a low friction interface with another surface of another component. The low friction layer 1104 can be coupled to the radially outer surface of the substrate 1119 so as to form a low friction interface with another surface of another component.

In a number of embodiments, the low friction layer 1104 can include a low friction material. Low friction materials may include, for example, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction layer 1104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. Fluoropolymers may be used according to particular embodiments. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the low friction layer 1104 can have an axial height $T_{FL}$ in a range of 0.01 mm and 0.4 mm, such as in a range of 0.15 mm and 0.35 mm, or even in a range of 0.2 mm and 0.3 mm. The axial height of the low friction 1104 may be uniform, i.e., an axial height at a first location of the low friction layer 1104 can be equal to an axial height at a second location therealong. The low friction layer 1104 may overlie one major surface of the substrate 1119, shown, or overlie both major surfaces. In a number of embodiments, the substrate 1119 may extend at least partially along a length of the composite material 1000. The substrate 1119 may be at least partially encapsulated by the low friction layer 1104. That is, the low friction layer 1104 may cover at least a portion of the substrate 1119. Axial surfaces of the substrate 1119 may or may not be exposed from the low friction 1104. In an embodiment, the composite material

1000 can have an axial height $T_{SW}$ in a range of 0.01 mm and 5 mm, such as in a range of 0.15 mm and 2.5 mm, or even in a range of 0.2 mm and 1 mm.

Figure 2B:
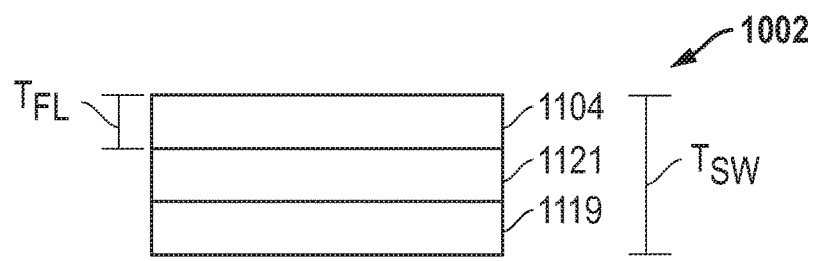
FIG. 2B includes a cross-sectional view of a push-on fastener in accordance with an embodiment.

FIG. 2B includes an illustration of an alternative embodiment of the composite material that may be formed according to first step 12 and second step 14 of the forming process 10. For purposes of illustration, FIG. 2B shows the layer by layer configuration of a composite material 1002 after second step 14. According to this particular embodiment, the composite material 1002 may be similar to the composite material 1000 of FIG. 2A, except this composite material 1002 may also include at least one adhesive layer 1121 that may couple the low friction layer 1104 to the substrate 1119 (i.e., the base material provided in the first step 12) and a low friction layer 1104 (i.e., the low friction coating applied in second step 14). In another alternate embodiment, the substrate 1119, as a solid component, woven mesh or expanded metal grid, may be embedded between at least one adhesive layer 1121 included between the low friction layer 1104 and the substrate 1119.

The adhesive layer 1121 may include any known adhesive material common to the fastener arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have an axial height of about 1 to 50 microns, such as about 7 to 15 microns.

Figure 2C:
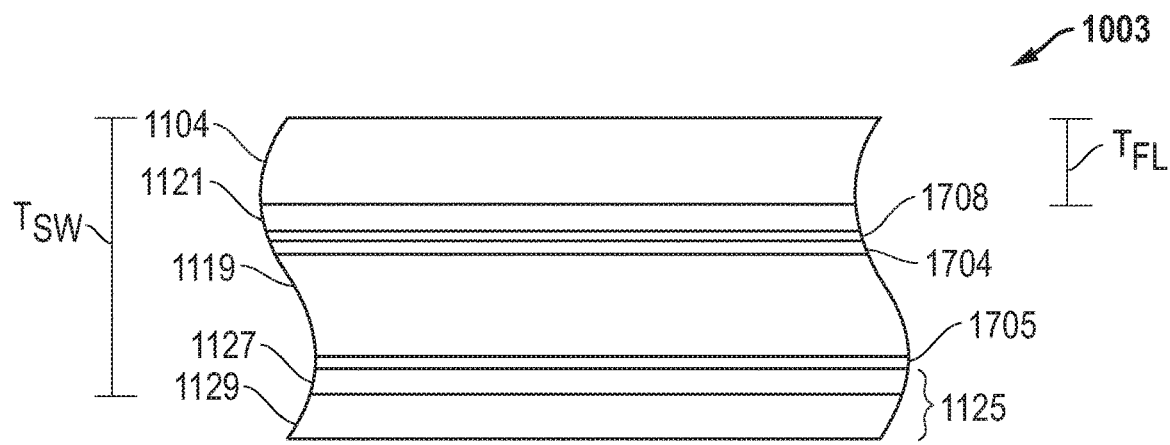
FIG. 2C includes a cross-sectional view of a push-on fastener in accordance with an embodiment.

FIG. 2C includes an illustration of an alternative embodiment of the composite material that may be formed according to first step 12 and second step 14 of the forming process 10. For purposes of illustration, FIG. 2C shows the layer by layer configuration of a composite material 1003 after second step 14. According to this particular embodiment, the composite material 1003 may be similar to the composite material 1002 of FIG. 2B, except this composite material 1003 may also include at least one corrosion protection layer 1704, 1705, and 1708, and a corrosion resistant coating 1124 that can include an adhesion promoter layer 1127 and an epoxy layer 1129 that may couple to the substrate 1119 (i.e., the base material provided in the first step 12) and a low friction layer 1104 (i.e., the low friction coating applied in second step 14).

The substrate 1119 may be coated with corrosion protection layers 1704 and 1705 to prevent corrosion of the composite material 1003 prior to processing. Additionally, a corrosion protection layer 1708 can be applied over layer 1704. Each of layers 1704, 1705, and 1708 can have an axial height of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

The composite material 1003 may further include a corrosion resistant coating 1125. The corrosion resistant coating 1125 can have a axial height of about 1 to 50 microns, such as about 5 to 20 microns, and such as about 7 to 15 microns. The corrosion resistant coating 1125 can include an adhesion promoter layer 1127 and an epoxy layer 1129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy layer 1129 can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C═O—O—C═O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In an embodiment, under step 14 of FIG. 1, any of the layers on the composite material 1000, 1002, 1003, as described above, can each be disposed in a roll and peeled therefrom to join together under pressure, at elevated temperatures (hot or cold pressed or rolled), by an adhesive, or by any combination thereof. Any of the layers of the composite material 1000, as described above, may be laminated together such that they at least partially overlap one another. Any of the layers on the composite material 1000, 1002, 1003, as described above, may be applied together using coating technique, such as, for example, physical or vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the substrate 1119. In another embodiment, the low friction layer 1104 may be cast or molded.

In other embodiments, under step 14 of FIG. 1, any of the layers on the composite material 1000, 1002, 1003, as described above, may be applied by a coating technique, such as, for example, physical or vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the substrate 1119. In another embodiment, the low friction layer 1104 may be cast or molded.

Referring now to the third step 16 of the forming process 10 as shown in FIG. 1, according to certain embodiments, forming the composite material 1000, 1002, 1003 into a push-on fastener may include a cutting operation. In an embodiment, the cutting operation may include use of a stamp, press, punch, saw, or may be machined in a different way. In a number of embodiments, the cutting operation may form a peripheral surface on the push-on fastener. The cutting operation may define a cutting direction initiated from a first major surface to a second major surface, opposite the first major surface, to form the peripheral surfaces or edges. Alternatively, the cutting operation may define a cutting direction initiated from the second major surface to the first major surface to form the peripheral surfaces or edges.

For purposes of illustration, FIGS. 3A-3D include an illustration showing a cutting operation to form a push on fastener 100. The push on fastener 100 may have a first major surface 107 and a second major surface 109. The push-on fastener 100 may further have an annular base 104. The push-on fastener 100 may further include at least one radial tab 110. As shown in FIGS. 3A-3B, the at least one radial tab 110 may include an inner radial edge 123. In an embodiment, the at least one radial tab 110 may define a peripheral surface 112a. As shown in FIGS. 3C-3D, the at least one radial tab 110 may include an outer radial edge 125. In an embodiment, the at least one radial tab 110 may define a peripheral surface 112b. In a number of embodiments, as shown in FIGS. 3A-3D, the push-on fastener 100 may be cut by a cutting operation to form one of the peripheral surfaces 112a, 112b after the low friction layer 1104, 1104' is formed on the substrate 1119. In a number of embodiments, two low friction layers 1104, 1104' may be coupled to the substrate 1119. FIG. 3A shows an upward cutting direction against an angle α on a push-on fastener 100 with inwardly facing radial tabs 110. FIG. 3B shows a downward cutting direction toward the angle α on a push-on fastener 100 with inwardly facing radial tabs 110. FIG. 3C shows an upward cutting direction against the angle α on a push-on fastener 100 with outwardly facing radial tabs 110. FIG. 3D shows a downward cutting direction toward the angle α on a push-on fastener 100 with outwardly facing radial tabs 110. In a number of embodiments, the cut may form an exposed surface 175 free of low friction layer 1104 on the push-on fastener 100. As shown in FIGS. 3A-3B, the cut may form an exposed surface 175 free of low friction layer 1104 on the inner radial edge 123 of the at least one radial tab 110 of the push-on fastener 100. As shown in FIGS. 3C-3D, the cut may form an exposed surface 175 free of low friction layer 1104 on the outer radial edge 125 of the at least one radial tab 110 of the push-on fastener 100. In a number of embodiments, as shown in FIGS. 3A-3D, the first major surface 107 may intersect at least one peripheral surface 112a, 112b to form a sharp corner 192 while the second major surface 109 may intersect the peripheral surface 112a, 112b to form a radiused corner 194. The sharp corner 192 may have burr 193 or have an extreme slope to otherwise form a sharp edge. The sharp corner 192 has a radius of curvature in the range of 0.0 mm to 0.2 mm. The radiused corner 194 may have a more gradual slope to otherwise form a smooth edge. The radiused corner 194 has a radius of curvature in the range of 0.0 mm to 0.2 mm.

Figure 4:
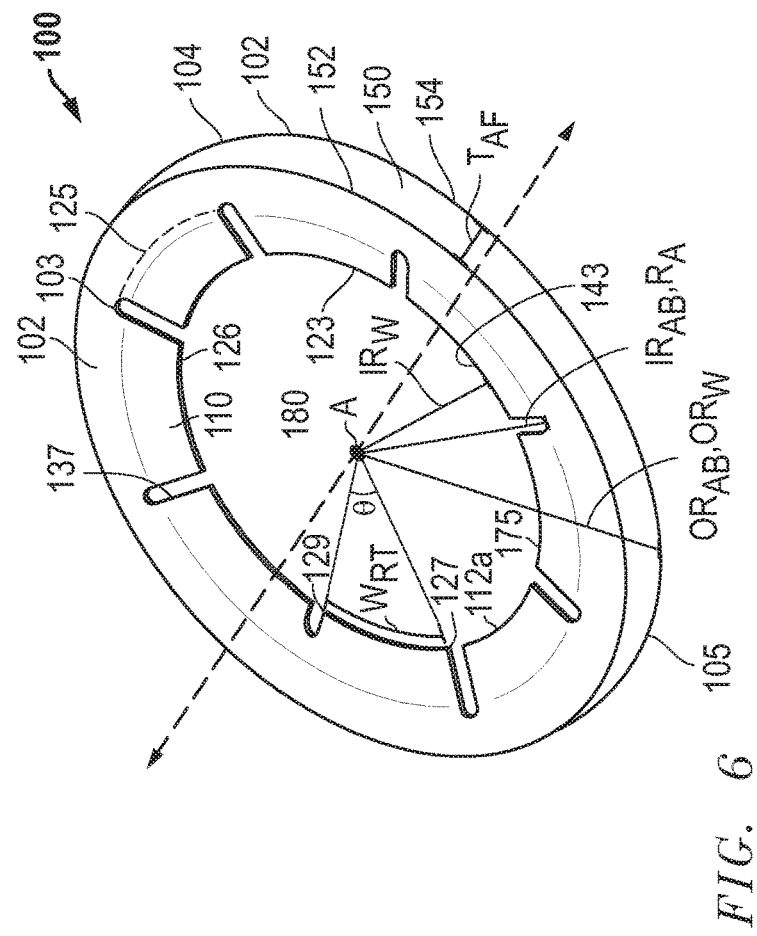
FIG. 4 includes a top view of a push-on fastener in accordance with an embodiment.

Turning now to the push-on fastener formed according to embodiments described herein, FIG. 4 includes a top view illustration of a push-on fastener 100. For purposes of illustration, FIG. 4 shows a top view of a push-on fastener 100 in accordance with embodiments described herein, which can include a push-on fastener body 102 oriented about a central axis A. The push-on fastener 100 may further have an annular base 104. The annular base 104 may include an inner radial edge 103 and an outer radial edge 105. The inner radial edge 103 may at least partially define an aperture 180 in the push-on fastener 100. The push-on fastener 100 may further include at least one radial tab 110 disposed along at least one of the inner radial edge 103 of the annular base 104.

In a number of embodiments, the annular base 104 may have a particular outer radius $OR_{AB}$. For purposes of embodiments described herein and as shown in FIG. 4, the outer radius $OR_{AB}$ of the annular base 104 is the distance from the central axis A to the outer radial edge 105. According to certain embodiment, the outer radius $OR_{AB}$ of the annular base 104 may be at least about 1 mm, such as, at least about 10 mm or at least about 20 mm or at least about 30 mm or at least about 40 mm or even at least about 50 mm. According to still other embodiments, the outer radius $OR_{AB}$ of the annular base 104 may be not greater than about 100 mm, such as, not greater than about 50 mm or even not greater than about 25 mm. It will be appreciated that the outer radius $OR_{AB}$ of the annular base 104 may be within a range between any of the minimum and maximum values noted above. It will be further appreciated that the outer radius $OR_{AB}$ of the annular base 104 may be any value between any of the minimum and maximum values noted above. For example, the outer radius $OR_{AB}$ of the annular base 104 may be 23 mm.

In a number of embodiments, the annular base 104 may have a particular inner radius $IR_{AB}$. For purposes of embodiments described herein and as shown in FIG. 4, the inner radius, $IR_{AB}$ of the annular base 104 is the distance from the central axis A to the inner radial edge 103. According to certain embodiment, the inner radius $IR_{AB}$ of the annular base 104 may be at least about 1 mm, such as, at least about 10 mm or at least about 20 mm or at least about 30 mm or at least about 40 mm or even at least about 50 mm. According to still other embodiments, the inner radius $IR_{AB}$ of the annular base 104 may be not greater than about 90 mm, such as, not greater than about 50 mm or even not greater than about 25 mm. It will be appreciated that the inner radius $IR_{AB}$ of the annular base 104 may be within a range between any of the minimum and maximum values noted above. It will be further appreciated that the inner radius $IR_{AB}$ of the annular base 104 may be any value between any of the minimum and maximum values noted above. For example, the inner radius $IR_{AB}$ of the annular base 104 may be 23 mm.

Figure 5:
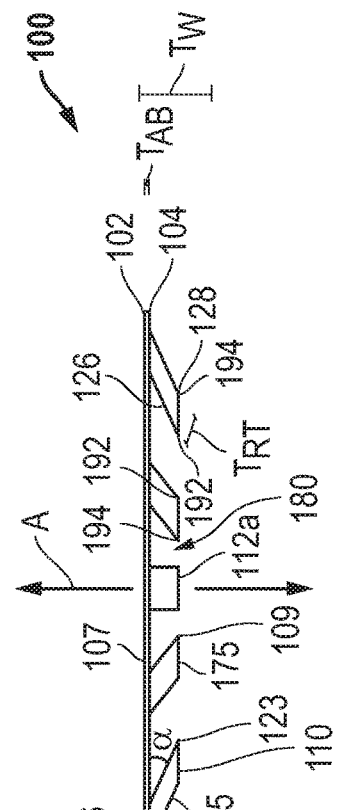
FIG. 5 includes a cross-sectional view of a push-on fastener in accordance with an embodiment.

For purposes of illustration, FIG. 5 includes a cross-sectional view of a push-on fastener 100, as shown in FIG. 4, in accordance with embodiments described herein. As shown in FIG. 5, the annular base 104 can include a first axial surface 106 and a second axial surface 108 opposite the first axial surface 106 oriented down the central axis A and spaced apart by a axial height $T_{AB}$. The annular base 104 may have a polygonal, oval, circular, semi-circular, or substantially circular cross-section when viewed in a plane perpendicular to the central axis A.

In a number of embodiments, the annular base 104 may have a particular axial height $T_{AB}$. For purposes of embodiments described herein and as shown in FIG. 5, the axial height $T_{AB}$ of the annular base 104 is the distance from the first axial surface 106 to the second axial surface 108. According to certain embodiment, the axial height $T_{AB}$ of the annular base 104 may be at least about 0.01 mm, such as, at least about 0.1 mm or at least about 0.2 mm or at least about 0.3 mm or at least about 0.4 mm or even at least about 0.5 mm. According to still other embodiments, the axial height $T_{AB}$ of the annular base 104 may be not greater than about 2 mm, such as, not greater than about 0.9 mm or even not greater than about 0.8 mm. It will be appreciated that the axial height $T_{AB}$ of the annular base 104 may be within a range between any of the minimum and maximum values noted above. It will be further appreciated that the axial height $T_{AB}$ of the annular base 104 may be any value between any of the minimum and maximum values noted above. For example, the axial height $T_{AB}$ of the annular base 104 may be 0.7 mm.

Referring back to FIG. 4, the push-on fastener 100 may include at least one radial tab 110. In a number of embodiments, the radial tab 110 may run the entire circumference of the push-on fastener 100. According to still other embodiments, the push-on fastener 100 may include a plurality of radial tabs 110, each extending from the annular base 104. According to yet other embodiments, the at least one radial tab 110 may project radially inwardly from the annular base 104.

According to still other embodiments, the at least one radial tab 110 may include an inner radial edge 123 and an outer radial edge 125. The outer radial edge 125 may be contiguous with the inner radial edge 103 of the annular base 104. The at least one radial tab 110 may include a first circumferential edge 127 and a second circumferential edge 129 along an arc length measured as an angle θ with respect to the central axis A, as shown best in FIG. 4. The inner radial edge 123 may at least partially define the aperture 180 in the push-on fastener 100 and/or annular base 104. As shown in FIG. 5, the at least one radial tab 110 can include a first axial surface 126 and a second axial surface 128 opposite the first axial surface 126.

As shown in both FIGS. 4 and 5, the radial tabs 110 can be circumferentially offset from one another. In embodiments with a plurality of radial tabs 110, the radial tabs 110 can be circumferentially offset from one another by a plurality of radial slots 137. The radial slots 137 may be gaps defining the first circumferential edge 127, and the second circumferential edge 129 of neighboring radial tabs 110. The at least one radial tab 110 may have a polygonal, oval, circular, semi-circular, or substantially circular cross-section when viewed in a plane generally perpendicular to the central axis A.

In a number of embodiments, as shown in FIG. 4, the at least one radial tab 110 may have a width $W_{RT}$, as measured in an arc length from the first circumferential edge 127 to the second circumferential edge 127. Width $W_{RT}$ can be calculated by the formula $W_{RT}=C\theta/360$, where θ is the angle formed between the first circumferential edge 127 and the second circumferential edge 127 with respect to the central axis A, and C is the circumference of the push-on fastener 100 along a best fit circle formed by inner radial edges 123 of the radial tabs 110 of the push-on fastener 100. According to certain embodiment, the width $W_{RT}$ of the at least one radial tab 110 may be at least about 1 mm, such as, at least about 10 mm or at least about 30 mm or at least about 40 mm or at least about 50 mm or even at least about 60 mm. According to still other embodiments, the width $W_{RT}$ of the at least one radial tab 110 may be not greater than about 100 mm, such as, not greater than about 50 mm or even not greater than about 25 mm. It will be appreciated that the width $W_{RT}$ of the at least one radial tab 110 may be within a range between any of the minimum and maximum values noted above. It will be further appreciated that the width $W_{RT}$ of the at least one radial tab 110 may be any value between any of the minimum and maximum values noted above. For example, the width $W_{RT}$ of the at least one radial tab 110 may be 25 mm.

In a number of embodiments, as shown in FIG. 5, the at least one radial tab 110 can have an axial height $T_{RT}$. For purposes of embodiments described herein, the axial height $T_{RT}$ of the at least one radial tab 110 is the distance from the first axial surface 126 to the second axial surface 128. According to certain embodiment, the axial height $T_{RT}$ of the at least one radial tab 110 may be at least about 0.1 mm, such as, at least about 0.2 mm or at least about 0.3 mm or at least about 0.4 mm or even at least about 0.5 mm. According to still other embodiments, the axial height $T_{RT}$ of the at least one radial tab 110 may be not greater than about 2 mm, such as, not greater than about 0.9 mm or even not greater than about 0.8 mm. It will be appreciated that the axial height $T_{RT}$ of the at least one radial tab 110 may be within a range between any of the minimum and maximum values noted above. It will be further appreciated that the axial height $T_{RT}$ of the at least one radial tab 110 may be any value between any of the minimum and maximum values noted above. For example, the axial height $T_{RT}$ of the at least one radial tab 110 may be 0.7 mm.

In a number of embodiments, as shown in FIG. 5, the at least one radial tab 110 can have a length $L_{RT}$. For purposes of embodiments described herein, the length $L_{RT}$ of the at least one radial tab 110 is the distance from the inner radial edge 123 to the outer radial edge 125. According to certain embodiment, the length $L_{RT}$ of the at least one radial tab 110 may be at least about 1 mm, such as, at least about 10 mm or at least about 30 mm or at least about 40 mm or at least about 50 mm or even at least about 60 mm. According to still other embodiments, the length $L_{RT}$ of the at least one radial tab 110 may be not greater than about 100 mm, such as, not greater than about 50 mm or even not greater than about 25 mm. It will be appreciated that the length $L_{RT}$ of the at least one radial tab 110 may be within a range between any of the minimum and maximum values noted above. It will be further appreciated that the length $L_{RT}$ of the at least one radial tab 110 may be any value between any of the minimum and maximum values noted above. For example, the length $L_{RT}$ of the at least one radial tab 110 may be 25 mm.

In an embodiment, as shown in FIG. 5, the at least one radial tab 110 can include a bridge portion 135 connecting the inner radial edge 123 of the at least one radial tab 110 to the annular base 104. In certain embodiments, the bridge portion 135 can cant relative to the central axis A. As stated above and now shown in FIG. 5, the bridge portion 135 can form an angle α with respect to the plane parallel to the annular base 104 and perpendicular to the central axis A. By way of a non-limiting embodiment, the angle α between the bridge portion 135 and the annular base 104 in the unloaded state can be at least 0.1°, such as at least 2°, at least 4°, at least 5°, or even at least 10°. In another embodiment, the angle α can be no greater than 45°, such as no greater than 40°, no greater than 35°, no greater than 30°, no greater than 25°, or even no greater than 20°. In still another embodiment, the angle α can be no less than or equal to 30°. It will be appreciated that the angle α may be within a range between any of the minimum and maximum values noted above. It will be further appreciated that the angle α may be any value between any of the minimum and maximum values noted above. For example, the angle α may be 43°.

In a number of embodiments, the angles α of the radial tabs 110 can all be uniform. In another embodiment, an angle α of at least one radial tab 110 may differ. In a particular embodiment, each angle α can be no less than 60°, such as no less than 90°, no less than 120°, or even no less than 150°. In a further embodiment, each angle α can be less than 180°, such as no greater than 170°, no greater than 160°, no greater than 150°, no greater than 140°, no greater than 130°, no greater than 120°, or even no greater than 110°. In a particular embodiment, the angles α can all lie along straight lines that extend in a substantially parallel direction. As used herein, "substantially parallel direction" refers to a deviation of no greater than 5° between the measured directions of two lines, such as no greater than 4°, no greater than 3°, or even no greater than 2°. In a more particular embodiment, the angles α can all lie along lines that extend in parallel. As used herein, "extend in parallel" refers to a deviation of no greater than 0.5° between the measured directions of two lines.

Per FIGS. 3A-3B, and as now shown in more detail in FIGS. 4 and 5, in an embodiment, the at least one radial tab 110 may define an inner peripheral surface 112a. In an embodiment, the inner radial edge 123 of at least one radial tab 110 may define the inner peripheral surface 112a. In this way, the radial tabs 110 project radially inwardly and forms the inner peripheral surface 112a. In a particular embodiment, at least one of the radial tabs 110 may have an exposed surface 175 defined as being free of the low friction layer 1104. As shown in FIG. 5, this exposed surface 175 may be the inner peripheral surface 112a at the inner radial end 123 of the radial tab 110.

As stated previously, and as shown in FIGS. 4 and 5, the inner radial edge 103 of the annular body 14, and the inner radial edge 123 of the at least one radial tab 110 may at least partially define an aperture 180 in the push-on fastener 100. The aperture 180 may have a polygonal, oval, circular, semi-circular, or substantially circular cross-section when viewed in a plane generally perpendicular to the central axis A. The aperture 180 may be non-uniform in shape.

In a number of embodiments, as shown in FIG. 4, the aperture 180 may have a radius, $R_A$. For purposes of embodiments described herein, the aperture radius $R_A$ is the distance from the central axis A to the outermost point of either the inner radial edge 103 of the annular base 104, or the inner radial edge 123 of the at least one radial tab 110. According to certain embodiment, the aperture radius $R_A$ may be at least about 1 mm, such as, at least about 10 mm or at least about 30 mm or at least about 40 mm or at least about 50 mm or even at least about 60 mm. According to still other embodiments, aperture radius $R_A$ may be not greater than about 100 mm, such as, not greater than about 50 mm or even not greater than about 25 mm. It will be appreciated that the aperture radius $R_A$ may be within a range between any of the minimum and maximum values noted above. It will be further appreciated that the aperture radius $R_A$ may be any value between any of the minimum and maximum values noted above. For example, the aperture radius $R_A$ may be 25 mm.

In a number of embodiments, as shown in FIG. 5, the push-on fastener 100 can have an axial height $T_W$. For purposes of embodiments described herein, the axial height $T_W$ of the push-on fastener 100 is the distance from the more axially distant of either the first axial surface 106 of the annular base 104 or the second axial surface 154 of the axial flange 150, and second axial surface 128 of the innermost radial tab 110. According to certain embodiment, the axial height $T_W$ of the push-on fastener 100 may be at least about 0.1 mm, such as, at least about 0.2 mm or at least about 0.3 mm or at least about 0.4 mm or even at least about 0.5 mm. According to still other embodiments, the axial height $T_W$ of the push-on fastener 100 may be not greater than about 100 mm, such as, not greater than about 90 mm or even not greater than about 80 mm. It will be appreciated that the axial height $T_W$ of the push-on fastener 100 may be within a range between any of the minimum and maximum values noted above. It will be further appreciated that the axial height $T_W$ of the push-on fastener 100 may be any value between any of the minimum and maximum values noted above. For example, the axial the axial height $T_W$ of the push-on fastener 100 may be 0.7 mm.

In a number of embodiments, as shown in FIG. 4, the push-on fastener 100 may have an overall outer radius $OR_W$. For purposes of embodiments described herein, the outer radius $OR_W$ of the push-on fastener 100 is the distance from the central axis A to the radially outermost periphery of the push-on fastener 100, which may be either the outer radial edge 155 of the axial flange 150, the outer radial edge 105 of the annular base 104, or the outer radial edge 125 of the at least one radial tab 110. According to certain embodiment, the outer radius $OR_W$ of the push-on fastener 100 may be at least about 1 mm, such as, at least about 10 mm or at least about 20 mm or at least about 30 mm or at least about 40 mm or even at least about 50 mm. According to still other embodiments, the outer radius $OR_W$ of the push-on fastener 100 may be not greater than about 100 mm, such as, not greater than about 50 mm or even not greater than about 25 mm. It will be appreciated that the outer radius $OR_W$ of the push-on fastener 100 may be within a range between any of the minimum and maximum values noted above. It will be further appreciated that the outer radius $OR_W$ of the push-on fastener 100 may be any value between any of the minimum and maximum values noted above. For example, the outer radius $OR_W$ of the push-on fastener 100 may be 23 mm.

In a number of embodiments, as shown in FIG. 4, the push-on fastener 100 may have an overall inner radius $IR_W$. For purposes of embodiments described herein, the inner radius $IR_W$ of the push-on fastener 100 is the distance from the central axis A to the radially innermost periphery of the push-on fastener 100, which may be either the inner radial edge 123 of the innermost radial tab 110, the inner radial edge 153 of the axial flange 150, or the inner radial edge 103 of the annular base 104. According to certain embodiment, the inner radius $IR_W$ of the push-on fastener 100 may be at least about 1 mm, such as, at least about 10 mm or at least about 20 mm or at least about 30 mm or at least about 40 mm or even at least about 50 mm. According to still other embodiments, the inner radius $IR_W$ of the push-on fastener 100 may be not greater than about 100 mm, such as, not greater than about 50 mm or even not greater than about 25 mm. It will be appreciated that the inner radius $IR_W$ of the push-on fastener 100 may be within a range between any of the minimum and maximum values noted above. It will be further appreciated that the inner radius $IR_W$ of the push-on fastener 100 may be any value between any of the minimum and maximum values noted above. For example, the inner radius $IR_W$ of the push-on fastener 100 may be 23 mm.

Figure 6:
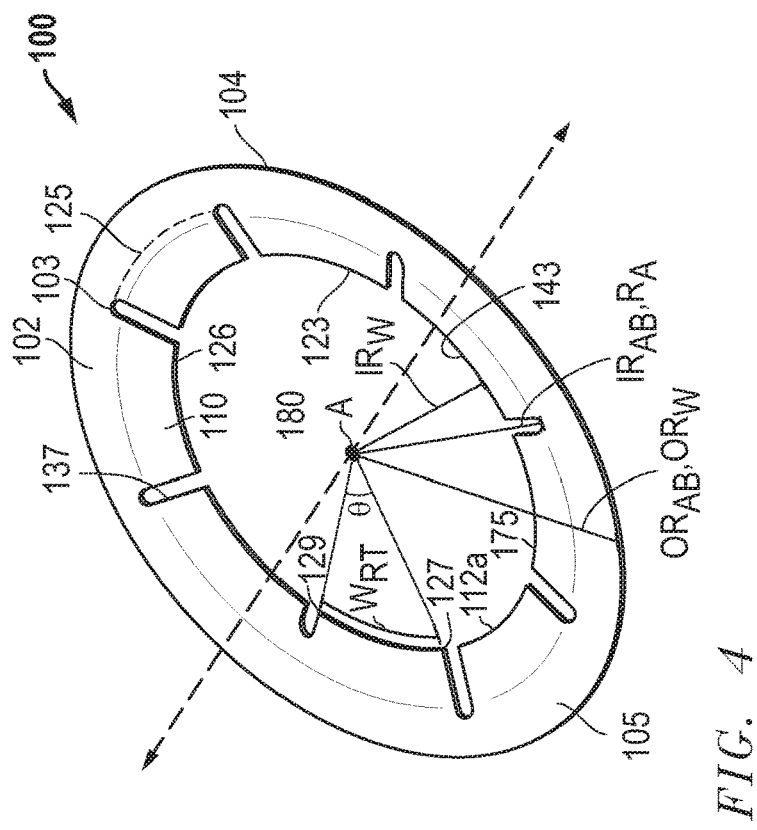
FIG. 6 includes a perspective top view of a push-on fastener in accordance with an embodiment.

For purposes of illustration, FIG. 6 includes a perspective top view of a push-on fastener 100 in accordance with alternative embodiments described herein. It will be appreciated that corresponding components between FIG. 6 and FIGS. 4 and 5 (i.e., components having the same reference number) may be described as having any of the characteristics or features described in reference to FIGS. 4 and 5.

Referring now to FIG. 6, according to certain embodiments, the push-on fastener 100 can include a push-on fastener body 102 oriented about a central axis A. The push-on fastener 100 may further have an annular base 104. The push-on fastener 100 may further include at least one radial tab 110 disposed along at least one of the inner radial edge 103 of the annular base 104. As shown in these alternative embodiments, the push-on fastener 100 and/or annular base 104 may include an axial flange 150. The axial flange 150 may have a first axial surface 152 and a second axial surface 154 opposite the first axial surface 152. The axial flange 150 may have a polygonal, oval, circular, semi-circular, or substantially circular cross-section when viewed in a plane perpendicular to the central axis A. In certain embodiments, the axial flange 150 can cant relative to a line parallel to the central axis A.

In a number of embodiments, as shown in FIG. 6, the axial flange 150 can have an axial height $T_{AF}$. For purposes of embodiments described herein, the axial height $T_{AF}$ of the axial flange 150 is the distance from the first axial surface 152 to the second axial surface 154. According to certain embodiment, the axial height $T_{RT}$ of the axial flange 150 may be at least about 0.1 mm, such as, at least about 0.2 mm or at least about 0.3 mm or at least about 0.4 mm or even at least about 0.5 mm. According to still other embodiments, the axial height $T_{RT}$ of the axial flange 150 may be not greater than about 15 mm, such as, not greater than about 10 mm or even not greater than about 5 mm. It will be appreciated that the axial height $T_{RT}$ of the axial flange 150 may be within a range between any of the minimum and maximum values noted above. It will be further appreciated that the axial height $T_{RT}$ of the axial flange 150 may be any value between any of the minimum and maximum values noted above. For example, the axial the axial height $T_{RT}$ of the axial flange 150 may be 0.7 mm.

For purposes of illustration, FIGS. 7A-7C includes a top view, a cross-sectional view, and a perspective view respectively of a push-on fastener 100 in accordance with alternative embodiments described herein. It will be appreciated that corresponding components between FIGS. 7A-7C and FIGS. 4, 5, and 6 (i.e., components having the same reference number) may be described as having any of the characteristics or features described in reference to FIGS. 4, 5, and 6.

Referring now to FIGS. 7A-7C, according to certain embodiments, the push-on fastener 100 can include a push-on fastener body 102 oriented about a central axis A. The push-on fastener 100 may further have an annular base 104. The push-on fastener 100 may further include at least one radial tab 110 disposed along the outer radial edge 105 of the annular base 104. As shown in these alternative embodiments, the at least one radial tab 110 may project radially outward from the annular base 104. In these embodiments, the at least one radial tab 110 may include an inner radial edge 123 and an outer radial edge 125. In this embodiment, the inner radial edge 123 of the radial tab 110 may coincide with the outer radial edge 105 of the annular base 104. In this embodiment the at least one radial tab 110 can define an outer radial edge 125 and a bridge portion 135 connecting the outer radial edge 125 to the annular base 104.

Per FIGS. 3C-3D and as now shown in more detail in FIGS. 7A-7C, in an embodiment, the at least one radial tab 110 may define an outer peripheral surface 112b. In this alternative embodiment, the outer radial edge 125 of at least one radial tab 110 may define the outer peripheral surface 112b. In this way, the radial tabs 110 project radially outwardly and forms the outer peripheral surface 112b. In a particular embodiment, at least one of the radial tabs 110 may have an exposed surface 175 defined as being free of the low friction layer 1104.

In an embodiment, as shown in FIGS. 7A-7C, the axial flange 150 may include an inner radial edge 153 and an outer radial edge 155. The axial flange 150 can have a length L. For purposes of embodiments described herein, the length $L_{AF}$ of the axial flange 150 is the distance from the inner radial edge 153 to the outer radial edge 155. According to certain embodiment, the length $L_{AF}$ of the axial flange 150 may be at least about 1 mm, such as, at least about 10 mm or at least about 30 mm or at least about 40 mm or at least about 50 mm or even at least about 60 mm. According to still other embodiments, the length $L_{AF}$ of the axial flange 150 may be not greater than about 100 mm, such as, not greater than about 50 mm or even not greater than about 25 mm. It will be appreciated that the length $L_{AF}$ of the axial flange 150 may be within a range between any of the minimum and maximum values noted above. It will be further appreciated that the length L of the axial flange 150 may be any value between any of the minimum and maximum values noted above. For example, the length the length L of the axial flange 150 may be 25 mm.

For purposes of illustration, FIGS. 8A-8E includes a top view, a side view, a side view, a top cutout view, and a cross-sectional view respectively of a push-on fastener 100 within an assembly 500 in accordance with alternative embodiments described herein. It will be appreciated that corresponding components between FIGS. 8A-8E (i.e., components having the same reference number) may be described as having any of the characteristics or features described in reference to FIGS. 8A-8E. In a number of embodiments, the push-on fastener 100 can be disposed adjacent to, or contacting, an inner member 528 (such as a shaft) in an assembly 500. The assembly 500 may also include an outer member 530 (such as a bearing, housing, a side member, or other structural member) fitted on the inner member 528. In an embodiment, the outer member 530 may be adapted to rotate relative to the inner member 528. In another embodiment, the inner member 528 may be adapted to rotate relative to the outer member 530. The push-on fastener 100 can be disposed adjacent to, or contacting, an inner member 528 in an assembly 500. In a number of embodiments, the push-on fastener 100 may be installed on the inner member 528 in the assembly 500. In a number of embodiments, the at least one radial tab 110 of the push-on fastener 100 may fix the push-on fastener 100 to the inner member 528 in the assembly 500.

During and after installation, the at least one radial tab 110 may be adapted to radially deform. The at least one radial tab 110 can operate in an elastic zone of deformation, i.e., the at least one radial tab 110 can be capable of deforming upon application of a force and returning to its original shape after removal of the force. In a further embodiment, at least one at least one radial tab 110 can operate in a plastic zone of deformation, i.e., the at least one radial tab 110 can be incapable of fully returning to its original shape after removal the force. It may be possible, by including at least one radial tab 110 of different deformation characteristics on the annular base 104, to yet further alter the characteristics of the push-on fastener 100, e.g., stiffness, sliding capability, or tolerance absorption.

Figure 8A:
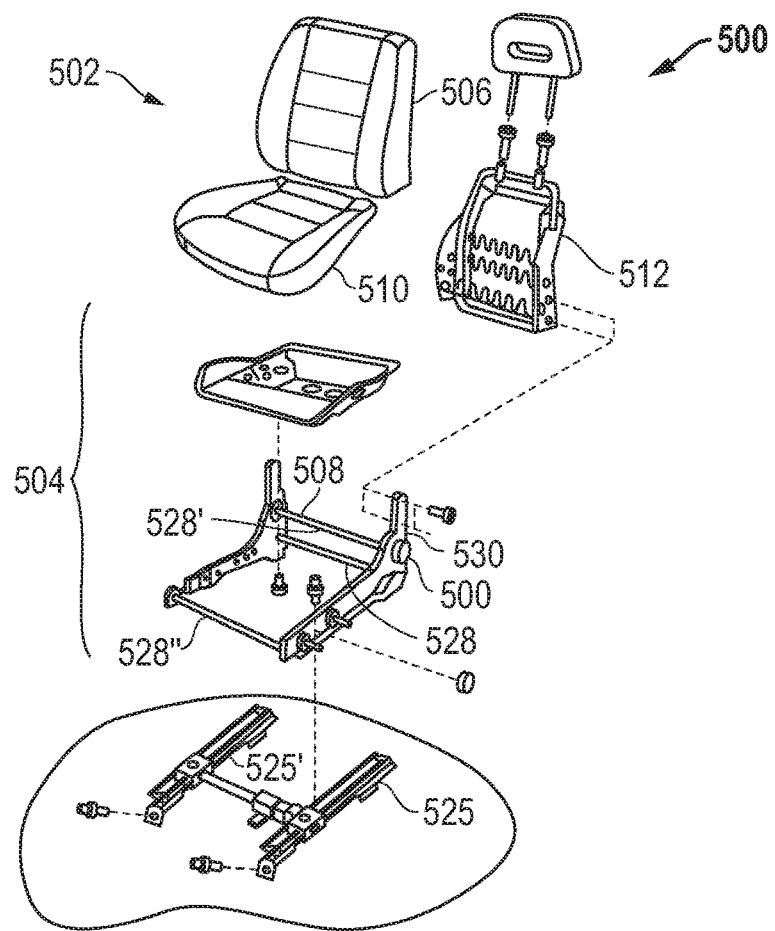
FIG. 8A includes a top view of a push-on fastener within an assembly in accordance with an embodiment.
Figure 8B:
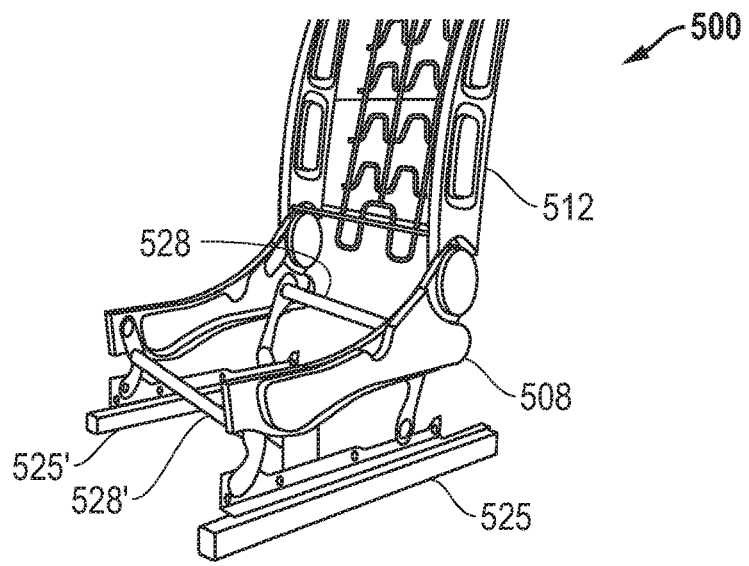
FIG. 8B includes a side view of a push-on fastener within an assembly in accordance with an embodiment.
Figure 8C:
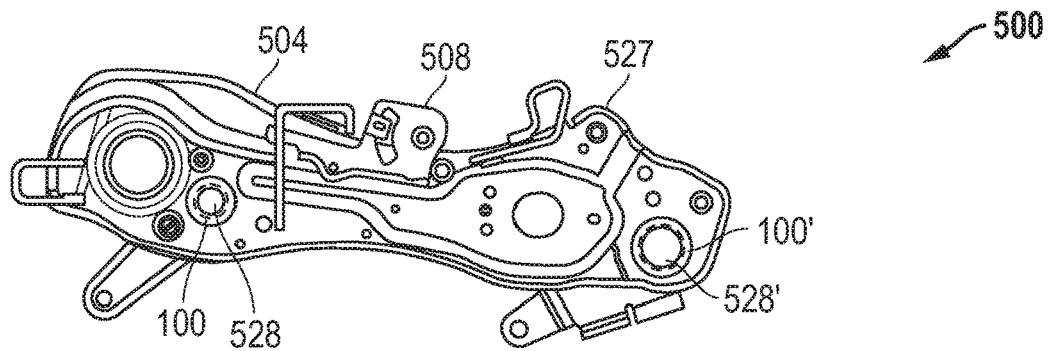
FIG. 8C includes a side view of a push-on fastener within an assembly in accordance with an embodiment.
Figure 8D:
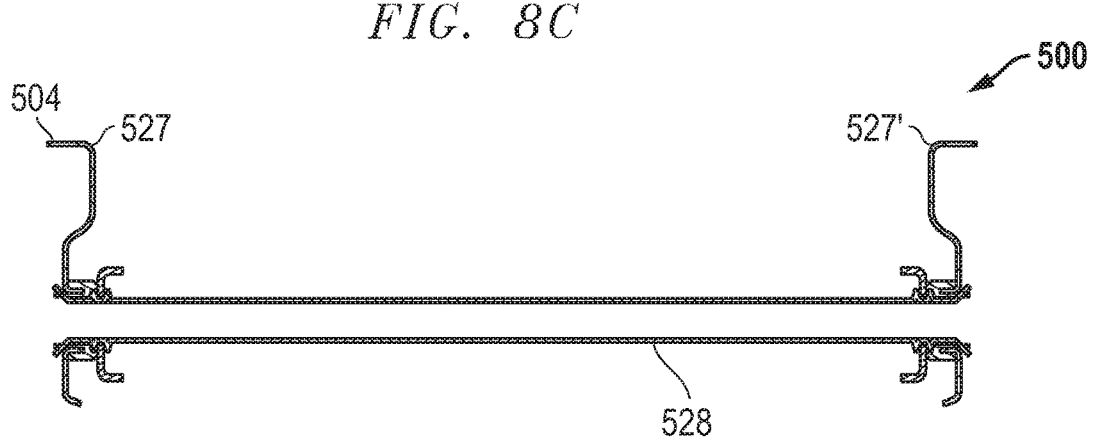
FIG. 8D includes a top cutout view of a push-on fastener within an assembly in accordance with an embodiment.

Referring to FIG. 8A, a non-limiting embodiment of an assembly 500 is shown. In an embodiment, the assembly 500 may be a seat assembly 500 for a vehicle. The seat assembly 500 generally includes a seat 502 having a bottom portion 504 and a seat back 506. The seat back 506 may be pivotally connected with the bottom portion 504. The bottom portion 504 may include a frame 508, a cover 510, and a cushion or support disposed therebetween. The seat back 506 may include an internal support 512. The seat assembly 500 may provide a location whereby a vehicle passenger may sit. The seat assembly 500 may include at least one sliding assembly 525, 525'. The seat assembly 500 can include at least one inner member 528, 528', 528". The seat assembly can include at least one outer member 530. The seat assembly can include at least one push-on fastener 100. FIG. 8B shows a side view of a push-on fastener 100 within an assembly 500 as shown in FIG. 8A. In a number of embodiments, the inner member 528 may be a cross-tube of the seat assembly 500 and part of the frame 508 of the bottom portion 504 of the seat assembly 500. FIG. 8C shows a side view of a plurality of push-on fasteners 100, 100' within an assembly having multiple inner members 528, 528'. FIG. 8C shows a cut-out top view of a push-on fastener 100 within an assembly. FIGS. 8C-D show the inner member 528, as it may be coupled to a side plate 527, 527' of the frame 508 of the bottom portion 504.

Figure 8E:
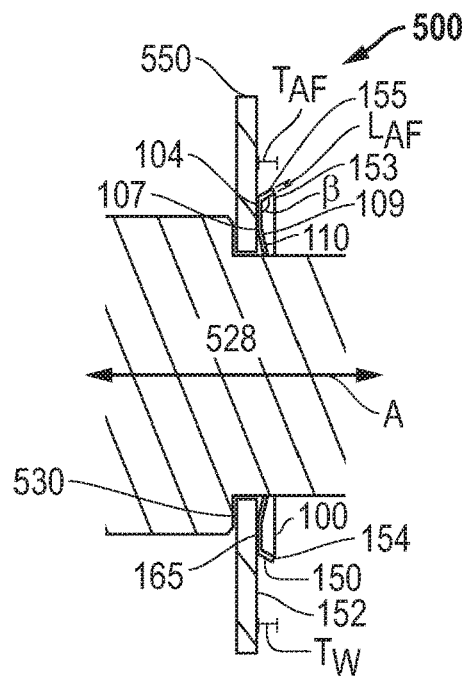
FIG. 8E includes a cross-sectional view of a push-on fastener within an assembly in accordance with an embodiment.

Referring now to FIG. 8E, in a number of embodiments, a push-on fastener 100 in accordance with one or more of the embodiments described herein can be disposed onto an inner member 528 (such as a shaft) to form an assembly 500 with the push-on fastener 100 in an installed state. The inner member 528 may be a cross-tube for a seat assembly 500 for a vehicle. In a number of variations, the assembly 500 may further include a side seat member 550. In a number of embodiments, the assembly 500 may further include a bearing 560. As shown in FIG. 8E, in a number of embodiments, at least one of the radial tabs 110 of the push-on fastener 100 may engage and/or contact at least one of the inner member 528 or the outer member 530. In another embodiment, the first major surface 107 of the push-on fastener 100 may define an axially interior surface and the second major surface 109 of the push-on fastener 100 may define an axially exterior surface while the plurality of radial tabs 110 project axially outwardly along the central axis A of the assembly 500. In an embodiment, the annular base 104 may include a bearing surface 165 that the outer member 530 contacts.

As shown in FIG. 8E, the axial flange 150 can form an angle β with respect to the plane parallel to the annular base 104 and perpendicular to the central axis A. By way of a non-limiting embodiment, the angle β between the axial flange 150 and the annular base 104 in the unloaded state can be at least 0°, such as at least 45°, at least 65°, at least 75°, or even at least 90°. In another embodiment, the angle β can be no greater than 180°, such as no greater than 135°, no greater than 120°, no greater than 90°, no greater than 75°, or even no greater than 45°. It will be appreciated that the angle β may be within a range between any of the minimum and maximum values noted above. It will be further appreciated that the angle β may be any value between any of the minimum and maximum values noted above. For example, the angle β may be 43°.

Figure 9C:
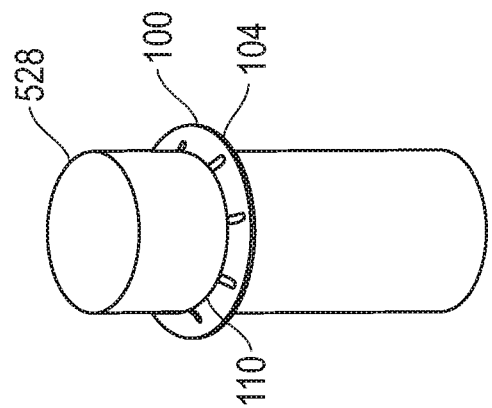
FIG. 9C includes a perspective view of a push-on fastener in accordance with an embodiment.
Figure 9B:
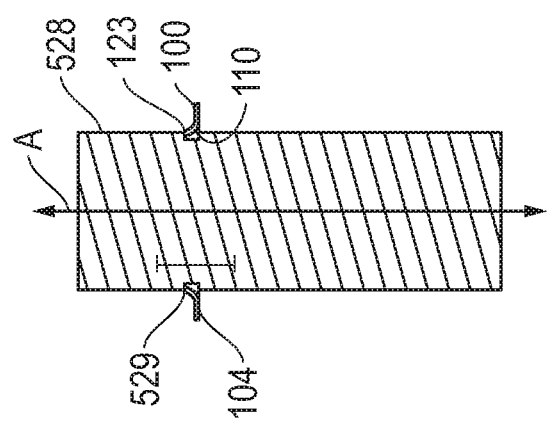
FIG. 9B includes a cross-sectional view of a push-on fastener in accordance with the first embodiment.
Figure 9A:
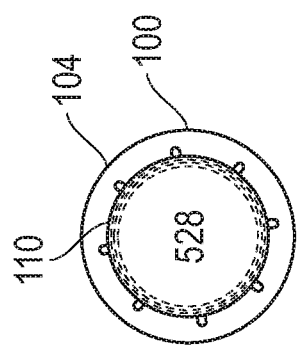
FIG. 9A includes a top view of a push-on fastener in accordance with an embodiment.

For purposes of illustration, FIGS. 9A-C show a top side, cross-sectional, and perspective view of a push-on fastener 100 within an assembly 500 respectively. In a number of embodiments, as shown in FIG. 9B, at least one of the inner radial edges 123 of the radial tabs 110 of the push-on fastener 100 may be keyed to the inner member 528 through matching or otherwise corresponding grooves 29 found in the inner member 528. In a number of variations, the grooves 529 may have a polygonal, oval, circular, semi-circular, or substantially circular cross-section and may coincide with the shape of at least one of the radial tabs 110 to form an interference fit preventing or restricting the relative movement of the push-on fastener 100 with at least one of the inner member 528.

In a number of embodiments, at least one of the first major surface 107 or a second major surface 109 of the push-on fastener 100 may be engaged with the outer member 530 so as to prevent or restrict relative movement between the push-on fastener 100 and the inner member 528. The movement may be prevented or restricted in a rotational, axial, or radial direction with respect to the central axis A. According to a particular embodiment, relative axial movement may be prevented. In a number of embodiments, at least one of the peripheral surfaces 112a, 112b of the push-on fastener 100 may form an interlock with at least one of the inner member 528 or the outer member 530. In a number of embodiments, the interlock may be a corner 192, 194 of at least one of the peripheral surfaces 112a, 112b contacting at least one of the inner member 528 or the outer member 530. In a number of embodiments, the sharp corner 192 may be adapted to contact at least one of the inner member 528 or the outer member 530 in an assembly 500.

In an embodiment, the push-on fastener 100 can provide a retention force on the inner member 528 of at least 1 N under a strain of less than 10 mm.

In an embodiment, the metal substrate 1119 and the low friction layer 1119 on the push-on fastener exhibit a peel strength (measured according to Standard ISO 4578 of greater than 20 N/cm, such as greater than 40 N/cm, greater than 50 N/cm, greater than 75 N/cm. In an embodiment, the metal substrate 1119 and the low friction layer 1119 on the push-on fastener exhibit a peel strength (measured according to Standard ISO 4578 of less than 100 N/cm, such as less than 75 N/cm, less than 50 N/cm, or less than 25 N/cm.

In an embodiment, the assembly 500 can be installed or assembled by an assembly force of at least 10 N a longitudinal direction relative to the inner member 528, such as at least 20 N, at least 30 N, at least 40 N, at least 50 N, at least 100 N, or even at least 150 N. In a further embodiment, the assembly 500 can be installed or assembled by an assembly force of at least 1 kgf in a longitudinal direction relative to the inner member 528, such as no greater than 1500 N, no greater than 1000 N, no greater than 750 N, or even no greater than 250 N.

Use of the push-on fastener 100 or assembly 500 may provide increased benefits in several applications such as, but not limited to, vehicle tail gates, door frames, seat assemblies, or other types of applications. Notably, the use of the push-on fastener 100 may provide a simplification of the assembly 500 by eliminating components. Further, use of the push-on fastener 100 may improve assembly forces required, compensate for axial tolerances between the inner and outer members 28, 30, and provide noise reduction and vibration decoupling within the assembly 500 by preventing undesired movement between the inner and outer members 28, 30. Further, the push-on fastener 100 may be a simple installation and be retrofit and cost effective across several possible assemblies of varying complexity. Further, the low friction layer 1104 on the push-on fastener 100 may provide low friction properties and act as an axial bearing while still being a fixation element against a component of the assembly 500. This can improve the friction performance between the push-on fastener 100 and other components of the assembly 500. Lastly, the use of the push-on fastener 100 may maintain the improved stiffness and tensile strength between the inner and outer members 28, 30, increasing the lifetime of the assembly 500.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A push-on fastener comprising: a push-on fastener body comprising an annular base defining an aperture, first and second opposing major surfaces, and a plurality of radial tabs extending from the annular base, the radial tabs terminating radially inwardly or radially outwardly and providing a peripheral surface; and a low friction layer overlying the first major surface of the push-on fastener body, wherein the peripheral surface is free of low friction layer.

Embodiment 2

An assembly comprising: an inner member comprising a shaft; an outer member fitted on the inner member, wherein at least one of the inner member and the outer member is adapted to rotate relative to the other; and a push-on fastener comprising: a push-on fastener body comprising an annular base defining an aperture, first and second opposing major surfaces, and a plurality of radial tabs extending from the annular base, the radial tabs terminating radially inwardly or radially outwardly and providing a peripheral surface; and a low friction layer overlying the first major surface of the push-on fastener body, wherein the peripheral surface is free of low friction layer.

Embodiment 3

The push-on fastener or assembly of any of the preceding embodiments, wherein the first major surface intersects the peripheral surface to form a sharp corner, wherein the second major surface intersects the peripheral surface to form a radiused corner.

Embodiment 4

The push-on fastener or assembly of embodiment 3, wherein the radiused corner has a radius of curvature in the range of 0.0 mm to 1.5 mm.

Embodiment 5

The push-on fastener or assembly of embodiment 3, wherein the sharp corner has a radius of curvature in the range of 0.0 mm to 1.5 mm.

Embodiment 6

The push-on fastener or assembly of embodiment 3, wherein the sharp corner is adapted to contact the inner member or outer member.

Embodiment 7

The push-on fastener or assembly of any of the preceding embodiments, wherein at least one of the radial tabs is adapted to radially deform.

Embodiment 8

The push-on fastener or assembly of any of the preceding embodiments, wherein the peripheral surface is formed by a cutting operation.

Embodiment 9

The push-on fastener or assembly of embodiment 8, wherein the cutting operation defines a cutting direction initiated from the second major surface to the first major surface to form the peripheral surface.

Embodiment 10

The assembly of embodiment 2, wherein the annular base comprises a bearing surface against which the outer member contacts.

Embodiment 11

The assembly of embodiment 2, wherein the outer member comprises at least one of a bearing or a side member.

Embodiment 12

The assembly of embodiment 2, wherein the push-on fastener provides a retention force on the inner member of at least 1 N under a strain of less than 10 mm.

Embodiment 13

The push-on fastener or assembly of any of the preceding embodiments, wherein the push-on fastener body comprises a metal, such as iron, copper, titanium, tin, aluminum, or an alloy thereof.

Embodiment 14

The push-on fastener or assembly of embodiment 13, wherein the push-on fastener body comprises stainless steel or carbon steel.

Embodiment 15

The push-on fastener or assembly of any of the preceding embodiments, wherein the low friction layer comprises a fluoropolymer.

Embodiment 16

The push-on fastener or assembly of any of the preceding embodiments, wherein the push-on fastener further comprises an adhesive layer disposed between the push-on fastener body and the low friction layer.

Embodiment 17

The push-on fastener or assembly of any of the preceding embodiments, wherein the plurality of radial tabs are circumferentially spaced apart from one another by a plurality of radial slots.

Embodiment 18

The push-on fastener or assembly of any of the preceding embodiments, wherein the first major surface defines an axial interior surface, the second major surface defines an axial exterior surface, and the plurality of radial tabs project axially outwardly.

Embodiment 19

The push-on fastener or assembly of any of the preceding embodiments, wherein at least one of the radial tabs forms an angle $\alpha$ with a cross-sectional plane of the annular base in the axial direction, wherein $\alpha \leq 30°$.

Embodiment 20

The push-on fastener or assembly of any of the preceding embodiments, wherein the aperture has a radius within the range of between 5 mm and 25 mm.

Embodiment 21

The push-on fastener or assembly of any of the preceding embodiments, wherein the push-on fastener body and the low friction layer exhibit a peel strength (measured according to Standard ISO 4578 of greater than 20 N/cm.

Embodiment 22

The assembly of embodiment 2, wherein the assembly comprises a seat assembly for a vehicle.

Embodiment 23

The push-on fastener or assembly of any of the preceding embodiments, wherein the push-on fastener further comprises an axial flange.

Embodiment 24

The push-on fastener or assembly of any of the preceding embodiments, wherein the radial tabs project radially outwardly and the peripheral surface forms an outer peripheral surface.

Embodiment 25

The push-on fastener or assembly of embodiment 24, wherein the annular base defines an inner peripheral surface opposite the outer peripheral surface.

Embodiment 26

The push-on fastener or assembly of embodiment 24, wherein the inner peripheral surface is free of the low friction layer.

Embodiment 27

The push-on fastener or assembly of any of embodiments 1-22, wherein the radial tabs project radially inwardly and the peripheral surface forms an inner peripheral surface.

Embodiment 28

The push-on fastener or assembly of embodiment 26, wherein the annular base defines an outer peripheral surface opposite the inner peripheral surface.

Embodiment 29

The push-on fastener or assembly of embodiment 27, wherein the outer peripheral surface is free of the low friction layer.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A push-on fastener comprising:
   a push-on fastener body comprising a substrate comprising spring steel and forming an annular base defining an aperture, first and second opposing major surfaces, and a plurality of radial tabs extending from the annular base, the radial tabs terminating radially inwardly or radially outwardly; and
   a low friction layer comprising a polymer overlying and laminated to the substrate, wherein the annular base further defines an inner peripheral surface and an outer peripheral surface opposite the inner peripheral surface, wherein 1) the radial tabs terminate radially inwardly providing the inner peripheral surface, or 2) the radial tabs terminate radially outwardly providing the outer peripheral surface, wherein the low friction layer has an axial height $T_{FL}$ in a range of 0.1 mm and 0.4 mm, wherein the low friction layer is overlying and laminated to the substrate 1) along the first major surface but not the second major surface of the push-on fastener body, or 2) along the second major surface but not the first major surface of the push-on fastener body.

2. An assembly comprising:
an inner member comprising a shaft;
an outer member fitted on the inner member, wherein at least one of the inner member and the outer member is adapted to rotate relative to the other; and
a push-on fastener comprising:
a push-on fastener body comprising a substrate comprising spring steel and forming an annular base defining an aperture, first and second opposing major surfaces, and a plurality of radial tabs extending from the annular base, the radial tabs terminating radially inwardly or radially outwardly; and
a low friction layer comprising a polymer overlying and laminated to the substrate, wherein the annular base further defines an inner peripheral surface and an outer peripheral surface opposite the inner peripheral surface, wherein 1) the radial tabs terminate radially inwardly providing the inner peripheral surface, or 2) the radial tabs terminate radially outwardly providing the outer peripheral surface, wherein the low friction layer has an axial height $T_{FL}$ in a range of 0.1 mm and 0.4 mm. wherein the low friction layer is overlying and laminated to the substrate 1) along the first major surface but not the second major surface of the push-on fastener body, or 2) along the second major surface but not the first major surface of the push-on fastener body.

3. The push-on fastener of claim 1, wherein the second major surface intersects the peripheral surface to form a radiused corner, wherein the radiused corner has a radius of curvature in the range of 0.0 mm to 1.5 mm.

4. The push-on fastener of claim 1, wherein the first major surface intersects the peripheral surface to form a sharp corner, wherein the sharp corner has a radius of curvature in the range of 0.0 mm to 1.5 mm.

5. The push-on fastener of claim 1, wherein the first major surface intersects the peripheral surface to form a sharp corner, wherein the sharp corner is adapted to contact the inner member or outer member.

6. The push-on fastener of claim 1, wherein at least one of the radial tabs is adapted to radially deform.

7. The push-on fastener of claim 1, wherein the peripheral surface is formed by a cutting operation.

8. The push-on fastener of claim 7, wherein the cutting operation defines a cutting direction initiated from the second major surface to the first major surface to form the peripheral surface.

9. The push-on fastener of claim 1, wherein the low friction layer comprises a fluoropolymer.

10. The push-on fastener of claim 1, wherein the plurality of radial tabs are circumferentially spaced apart from one another by a plurality of radial slots.

11. The push-on fastener of claim 1, wherein at least one of the radial tabs forms an angle $\alpha$ with a cross-sectional plane of the annular base in the axial direction, wherein $\alpha \leq 30°$.

12. The push-on fastener of claim 1, wherein the push-on fastener body and the low friction layer exhibit a peel strength (measured according to Standard ISO 4578) of greater than 20 N/cm.

13. The push-on fastener of claim 1, wherein the first major surface intersects the peripheral surface to form a sharp corner having an extreme slope to form a sharp edge, wherein the second major surface intersects the peripheral surface to form a radiused corner having a smaller slope than the sharp corner to form a smooth edge.

14. The push-on fastener of claim 13, wherein the first major surface intersects the peripheral surface to form a sharp corner, wherein the sharp corner comprises a burr.

15. The push-on fastener of claim 1, wherein the low friction layer comprises polytetrafluoroethylene.

16. The push-on fastener of claim 1, wherein at least one radial tab of the plurality of radial tabs forms an angle $\alpha$ with a cutting direction of the fastener.

* * * * *